(12) United States Patent
Ding et al.

(10) Patent No.: US 11,556,008 B2
(45) Date of Patent: *Jan. 17, 2023

(54) OPTICAL APPARATUS AND WAVEGUIDE DISPLAY APPARATUS

(71) Applicant: JOURNEY TECHNOLOGY, LTD., Beijing (CN)

(72) Inventors: Wuwen Ding, Beijing (CN); Yu Zheng, Beijing (CN)

(73) Assignee: JOURNEY TECHNOLOGY, LTD., Beijing (CN)

( * ) Notice: Subject to any disclaimer, the term of this patent is extended or adjusted under 35 U.S.C. 154(b) by 110 days.

This patent is subject to a terminal disclaimer.

(21) Appl. No.: 17/000,492

(22) Filed: Aug. 24, 2020

(65) Prior Publication Data
US 2020/0387000 A1    Dec. 10, 2020

Related U.S. Application Data

(63) Continuation of application No. 16/009,883, filed on Jun. 15, 2018, now Pat. No. 10,838,212.

(30) Foreign Application Priority Data

Jun. 16, 2017   (CN) .......................... 201710457883.2

(51) Int. Cl.
| | | |
|---|---|---|
| G02B 27/01 | (2006.01) | |
| F21V 8/00 | (2006.01) | |
| G02F 1/1334 | (2006.01) | |
| G09G 3/00 | (2006.01) | |
| G02F 1/1347 | (2006.01) | |
| G02F 1/13 | (2006.01) | |

(52) U.S. Cl.
CPC ......... *G02B 27/0172* (2013.01); *G02B 6/005* (2013.01); *G02B 6/0026* (2013.01); *G02F 1/1326* (2013.01); *G02F 1/13342* (2013.01); *G02F 1/13471* (2013.01); *G09G 3/001* (2013.01); *G02B 2027/0123* (2013.01); *G02B 2027/0174* (2013.01); *G02F 2203/12* (2013.01)

(58) Field of Classification Search
CPC .. G02B 27/0172; G02B 6/0026; G02B 6/005; G02B 2027/0123; G02B 2027/0174; G02F 1/1326; G02F 1/13471; G02F 2203/12; G02F 1/13342; G09G 3/001
See application file for complete search history.

(56) References Cited

U.S. PATENT DOCUMENTS

2015/0125109 A1*   5/2015   Robbins ............. G02B 27/0172
                                                          385/10
2019/0011703 A1*   1/2019   Robaina .................. G06F 3/013

* cited by examiner

*Primary Examiner* — Roy P Rabindranath
(74) *Attorney, Agent, or Firm* — Westbridge IP LLC

(57) ABSTRACT

An optical apparatus includes an image source, a relay optical system, and an optical processing system. The image source is configured to display an image. The relay optical system is configured to project the image displayed by the image source to the optical processing system, and to image at infinity. The optical processing system is configured to project incident light from the relay optical system in a same direction to at least two preset directions sequentially.

7 Claims, 20 Drawing Sheets

OPTICAL APPARATUS AND WAVEGUIDE DISPLAY APPARATUS

CROSS-REFERENCE TO RELATED APPLICATION

This application is a continuation application of U.S. application Ser. No. 16/009,883, filed on Jun. 15, 2018, which claims priority to Chinese patent application No. 201710457883.2, filed on Jun. 16, 2017, the entire contents of which are incorporated herein by reference.

TECHNICAL FIELD

The present disclosure relates to the technical field of optics, and more particularly, to an optical apparatus and a waveguide display apparatus.

BACKGROUND

Along with the development of science and technology, an augmented reality display apparatus is attracting more and more attention. In order to enable the augmented reality display apparatus to adapt to different users and guarantee that image missing does not occur during a strenuous exercise, the augmented reality display apparatus needs a relatively large exit pupil diameter and there is further a requirement on miniaturization and light weight of the augmented reality display apparatus.

However, in the prior art, the purposes of a large exit pupil, a large view field and the like of the augmented reality display apparatus are implemented generally by increasing a volume of an image source, a diameter of a relay optical system and so on. Thus the volume and the weight of the display apparatus are greatly improved. Additionally, in order to obtain a relatively good display effect, a lens in a lens group of a relay system needs to be inclined in an off-axis manner and thus the optical distortion, aberration and the like are increased, and the difficulty in system design and system optimization is greatly improved.

SUMMARY

The embodiments of the present disclosure provide an optical apparatus and a waveguide display apparatus, and are intended to solve the problems of a relatively large volume of an image source and a high design complexity of a relay optical system in a head-mounted display apparatus. The following briefly describes the embodiments of the present disclosure in order to provide a basic understanding of some aspects of the present disclosure. This brief description is not intended as an extensive overview. It is not intended to identify key or critical elements, or to delineate a scope of protection of these embodiments. Its purpose is merely to present some concepts in a simplified form as a prelude to the more detailed description that is presented later.

According to a first aspect of the embodiments of the present disclosure, an optical apparatus is provided. The optical apparatus includes an image source, a relay optical system and an optical processing system, wherein,
the image source is configured to display an image;
the relay optical system is configured to project the image displayed by the image source to the optical processing system, and image at infinity; and
the optical processing system is configured to sequentially project incident light in a same direction to at least two preset directions.

According to a second aspect of the embodiments of the present disclosure, a Holographic Polymer Dispersed Liquid Crystal (HPDLC) optical apparatus is provided. The HPDLC optical apparatus includes an image source, a relay optical system, a first HPDLC layer and a second HPDLC layer that are arranged in a laminated manner, and a controller, wherein,
the image source is configured to display an image;
the relay optical system is configured to project the image displayed by the image source to the first HPDLC layer and the second HPDLC layer, and image at infinity;
the first HPDLC layer and the second HPDLC layer are perpendicular to an axial direction of the relay optical system, and directions of diffracted light from the first HPDLC layer and diffracted light from the second HPDLC layer are different from each other; and
the controller is configured to control to apply an electric field to the first HPDLC layer and the second HPDLC layer.

According to a third aspect of the embodiments of the present disclosure, a spatial light modulator optical apparatus is provided. The spatial light modulator optical apparatus includes an image source, a relay optical system, a spatial light modulator and a controller, wherein,
the image source is configured to display an image;
the relay optical system is configured to project the image displayed by the image source to the spatial light modulator, and image at infinity; and
the controller is configured to control the spatial light modulator to modulate emergent light.

According to a fourth aspect of the embodiments of the present disclosure, a waveguide display apparatus is provided. The waveguide display apparatus includes an image source, a relay optical system, an input coupler, a waveguide, an output coupler and an optical processing system, wherein,
the image source is configured to display an image;
the relay optical system is configured to project the image displayed by the image source to the optical processing system, and image at infinity;
the optical processing system is configured to sequentially project incident light in a same direction to at least two preset directions;
the input coupler is configured to couple emergent light of the optical processing system into the waveguide; and
the output coupler is configured to couple out light propagated in the waveguide.

According to a fifth aspect of the embodiments of the present disclosure, a waveguide display apparatus is provided. The waveguide display apparatus includes an image source, a relay optical system, an input coupler, a waveguide, an output coupler, a first Holographic Polymer Dispersed Liquid Crystal (HPDLC) layer and a second HPDLC layer that are arranged in a laminated manner, and a controller, wherein,
the image source is configured to display an image;
the relay optical system is configured to project the image displayed by the image source to the first HPDLC layer and the second HPDLC layer, and image at infinity;
the first HPDLC layer and the second HPDLC layer are perpendicular to an axial direction of the relay optical system, and directions of diffracted light from the first HPDLC layer and diffracted light from the second HPDLC layer are different from each other;
the controller is configured to control to apply an electric field to the first HPDLC layer and the second HPDLC layer;

the input coupler is configured to couple emergent light of the first HPDLC layer and the second HPDLC layer into the waveguide; and the output coupler is configured to couple out light propagated in the waveguide.

According to a sixth aspect of the embodiments of the present disclosure, a waveguide display apparatus is provided. The waveguide display apparatus includes an image source, a relay optical system, an input coupler, a waveguide, an output coupler, a spatial light modulator and a controller, wherein, the image source is configured to display an image;

the relay optical system is configured to project the image displayed by the image source to the spatial light modulator, and image at infinity;

the controller is configured to control the spatial light modulator to modulate emergent light;

the input coupler is configured to couple emergent light of the spatial light modulator into the waveguide; and the output coupler is configured to couple out light propagated in the waveguide.

According to the optical apparatus and the waveguide display apparatus based on the optical apparatus disclosed by the embodiments, a small-size image source may be used, and volumes of other components matched with the image source such as a drive circuit all may be reduced correspondingly; meanwhile, since view field angles of incident light rays of the relay optical system are reduced, the difficulty and the complexity in designing the relay optical system are reduced; and moreover, the number of the lenses included in the relay optical system may be reduced, and thus the volume of the relay optical system may be reduced.

It should be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

The following description and accompanying drawings fully illustrate the specific implementation solutions of the present disclosure so that a person skilled in the art can practice them. The embodiments merely represent possible changes. Unless otherwise specified explicitly, the individual component and function are optional and the operation sequence may be changed. Parts and characteristics of some implementation solutions may be included in or replace parts and characteristics of other implementation solutions. The scope of the implementation solutions of the present disclosure includes the whole scope of the claims and all available equivalents of the claims. As used herein, each implementation solution may be independently or generally expressed by "Disclosure", which is merely for convenience. As a matter of fact, if more than one disclosure is disclosed, it does not mean that the scope of the application is automatically limited to any single disclosure or disclosure concept. As used herein, terms such as "First" and "Second" are merely for distinguishing one entity or operation from another entity or operation and do not require or imply any actual relationship or sequence among these entities or operations. Moreover, terms such as "Comprise" and "Include" or any other variants indicate a non-exclusive inclusion, so that a process, method or device including a series of elements not only include these elements, but also include other elements not explicitly listed. As used herein, each embodiment is described progressively, and contents focally described in each embodiment are different from those in other embodiments. The same or similar parts among each of the embodiments may be referred to each other. Regarding a structure, a product and the like disclosed in the embodiments, since they are corresponding to parts disclosed in the embodiments, their description is relatively simple and relevant contents can be referred to the description in the method part.

Figure 1:
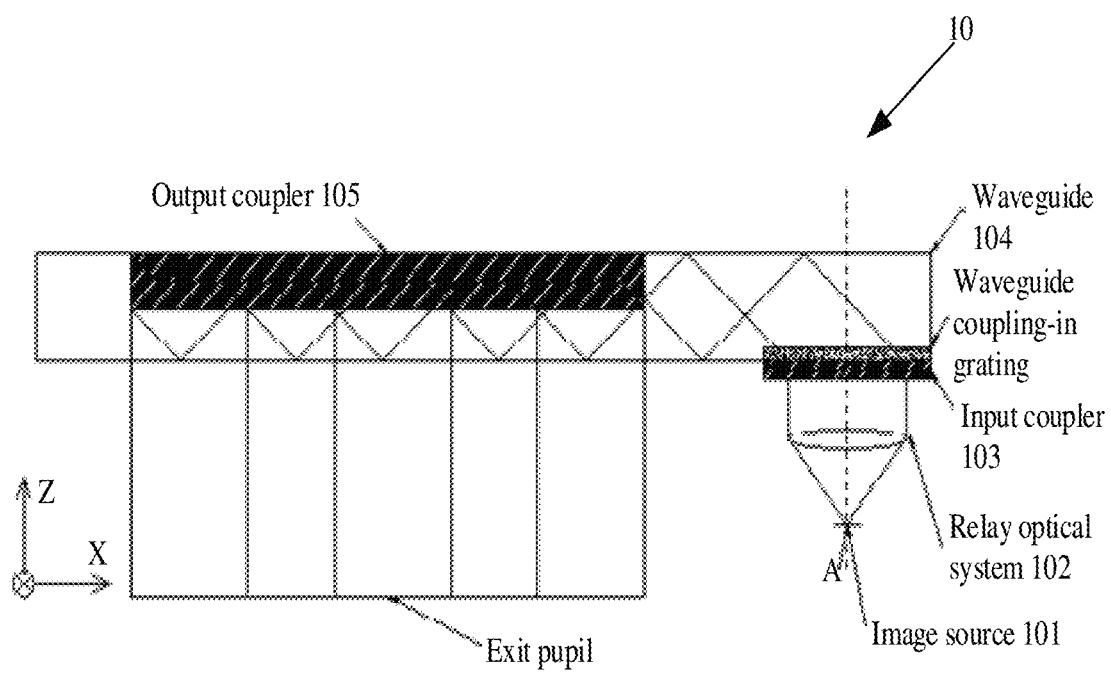
FIG. 1 is a schematic diagram of a waveguide display apparatus according to an embodiment of the present disclosure.
Figure 2:
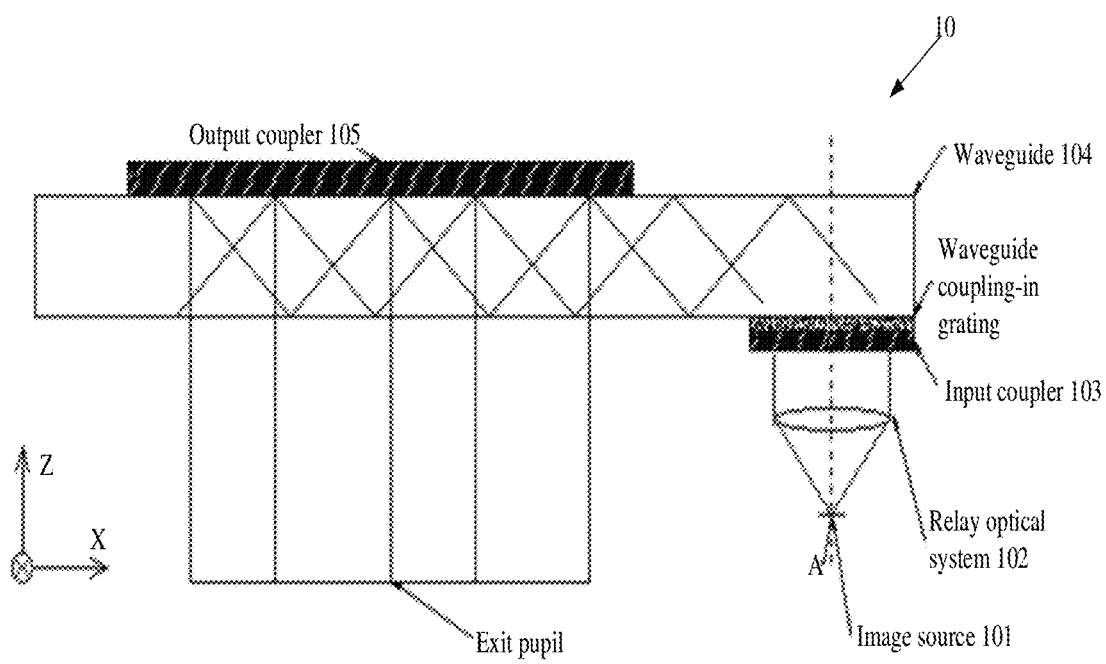
FIG. 2 is a schematic diagram of another waveguide display apparatus according to an embodiment of the present disclosure.

An embodiment of the present disclosure discloses a waveguide display apparatus 10, which includes an image source 101, a relay optical system 102, an input coupler 103, a waveguide 104 and an output coupler 105, wherein the input coupler 103 may include a waveguide coupling-in grating. FIG. 1 and FIG. 2 respectively show two optional structures of the waveguide display apparatus 10. FIG. 1 is a structure in which the waveguide coupling-in grating is positioned inside the waveguide. FIG. 2 is a structure in which the waveguide coupling-in grating is positioned outside the waveguide. Specifically, the image source 101 is configured to display an image;

the relay optical system 102 is configured to project the image displayed by the image source 101 to the input coupler 103;

the input coupler 103 is configured to couple emergent light of the relay optical system 102 into the waveguide 104; and the output coupler 105 is configured to couple out light propagated in the waveguide 104.

Optionally, the image source 101 may be a planar display screen or a curved display screen. Further optionally, the image source 101 may be a Liquid Crystal Display (LCD), a Liquid Crystal on Silicon (LCOS), a reflecting projection display screen, and a Light Emitting Diode (LED) display screen, etc.

The image displayed by the image source 101 is imaged via the relay optical system 102 at infinity. Optionally, the relay optical system 102 may be a lens group. Each of the lenses may be an aspherical lens or a freedom curved lens, and is configured to correct each optical aberration and chromatic aberration. A diffraction optical component also may be adopted to further optimize the imaging quality.

Figure 3:
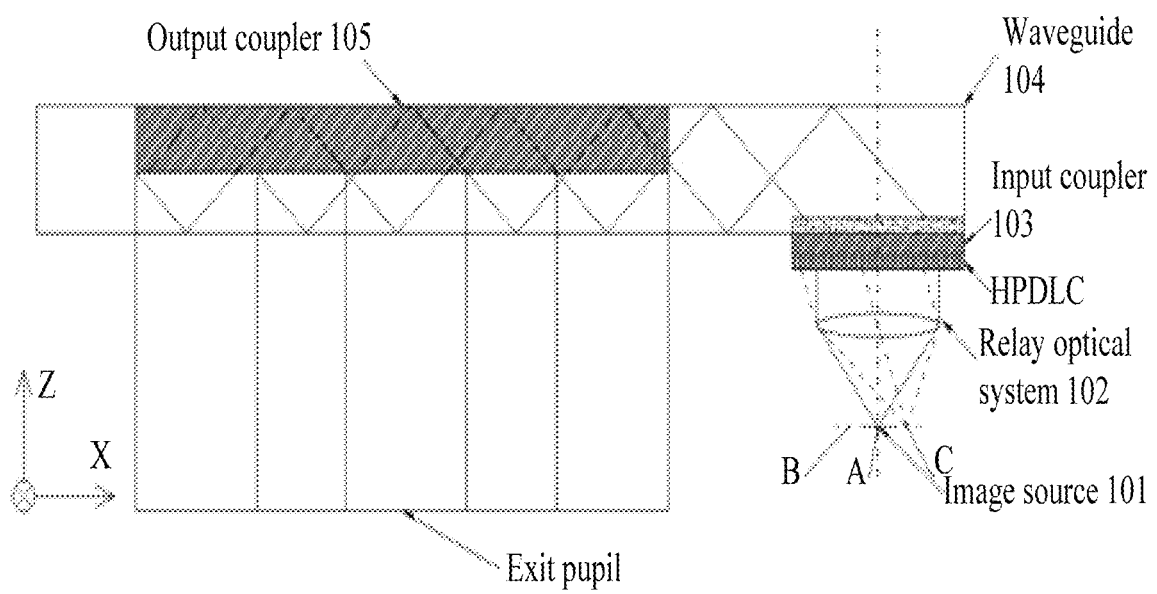
FIG. 3 is a schematic diagram of another waveguide display apparatus according to an embodiment of the present disclosure.

As shown in FIG. 3, a pixel point displayed by the image source 101 becomes parallel light to project after passing through the relay optical system 102. Different pixel points are dispersed at different angles after passing through the relay optical system 102 to form an angular spectrum. If there is a need to reach a preset view field angle, when spaces among pixels of the image source 101 are fixed, a size required by the image source 101 is an area shown by a line segment BAC in the figure, including a solid line section and dotted line sections on two sides of the solid line section. It should be understood by the person skilled in the art, images in the dotted portions are light rays at a large view field angle relative to the relay optical system 102, and may introduce relatively large optical aberrations such as spherical aberration and distortion. Generally, it may be appropriate to adopt more lenses or adopt other manners to correct the optical aberrations. However, the difficulty for designing the relay optical system 102 will be increased therefrom. Additionally, the volume of the image source 101 also will be increased.

Figure 4:
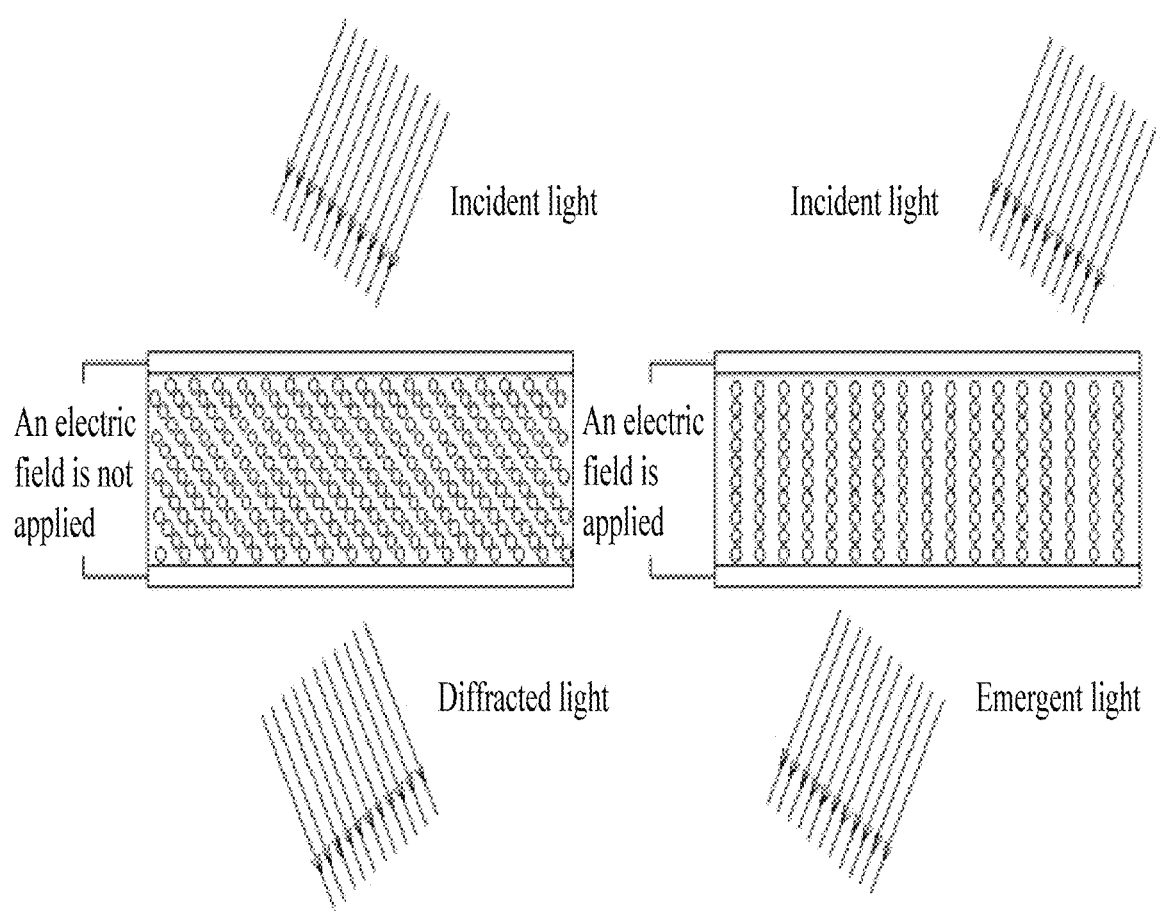
FIG. 4 is a schematic diagram of an HPDLC layer according to an embodiment of the present disclosure.

A volume holographic grating includes a fixed volume holographic grating and a switchable volume holographic grating. The switchable volume holographic grating may be prepared from an HPDLC. The HPDLC is a prepolymer composed of a liquid crystal and a polymer monomer, and under the irradiation of two beams of coherent light, using phase separation initiated by photopolymerization, forms a periodic arrangement in which polymer enriched areas and liquid crystal enriched areas corresponding to bright and dark stripes of interference stripes occur alternatively. As shown in FIG. 4, when an electric field is not applied, there exists periodic refractive index modulation in the HPDLC to form Bragg gratings, and the incident light meeting Bragg diffraction conditions is projected in a first-order diffraction direction. When an electric field is applied, liquid crystal molecules in the liquid crystal enriched areas are rearranged along the electric field. When the refractive rate of ordinary light is matched with the basic refractive rate of the polymer, the refractive rates of the gratings are uniform and consistent and the incident light is transmitted directly. Hence, the HPDLC becomes a transparent medium.

Figure 17:
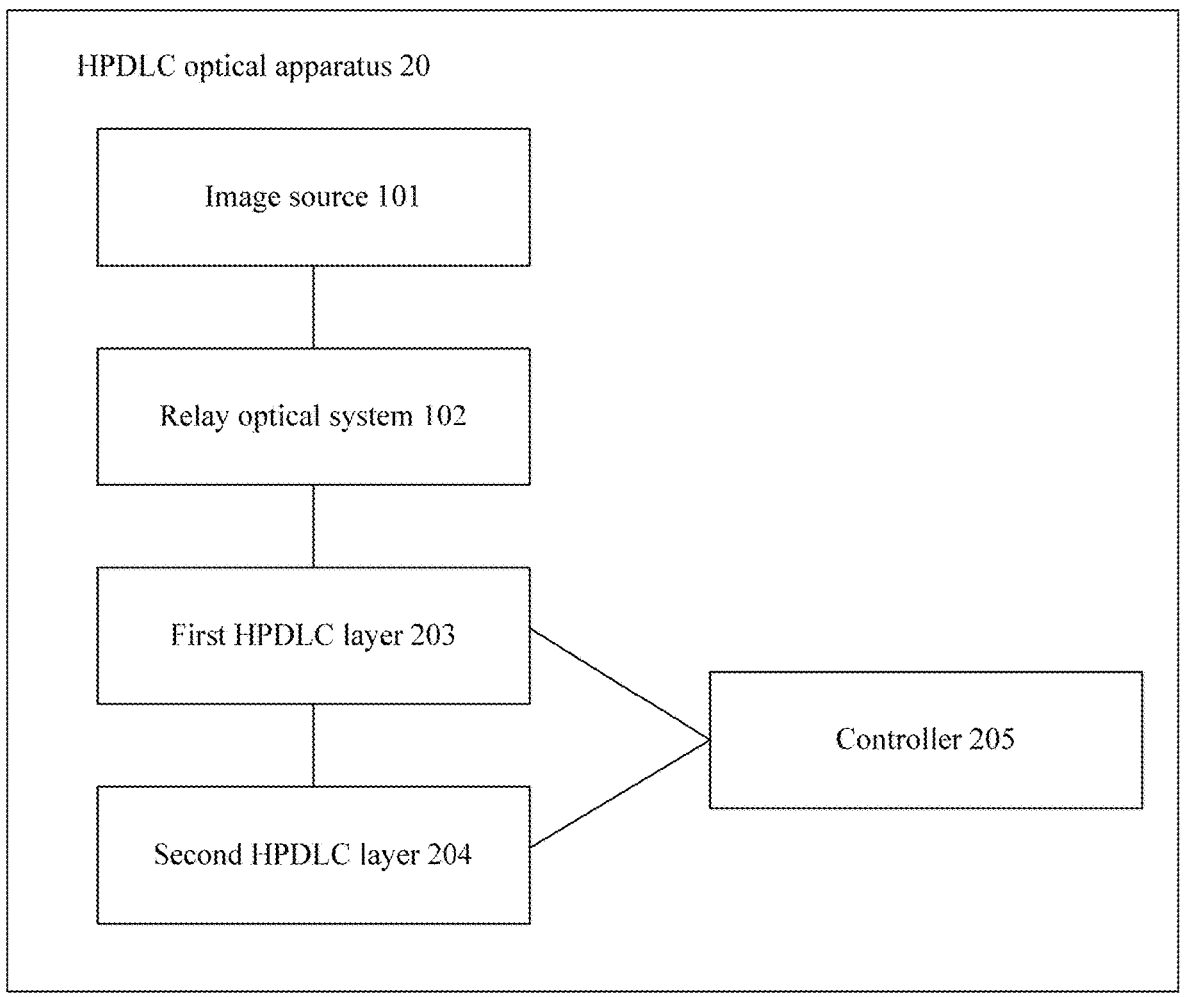
FIG. 17 is a schematic diagram of an HPDLC optical apparatus according to an embodiment of the present disclosure.

As shown in FIG. 17, on the basis of the waveguide display apparatus 10, an embodiment of the present disclosure further discloses an HPDLC optical apparatus 20, which includes an image source 101, a relay optical system 102, a first HPDLC layer 203 and a second HPDLC layer 204 that are arranged in a laminated manner, and a controller 205, where, the image source 101 is configured to display an image;

the relay optical system 102 is configured to project the image displayed by the image source 101 to the first HPDLC layer 203 and the second HPDLC layer 204, and image at infinity;

the first HPDLC layer 203 and the second HPDLC layer 204 are perpendicular to an axial direction of the relay optical system 102, and directions of diffracted light from the first HPDLC layer 203 and diffracted light from the second HPDLC layer 204 are different from each other; and the controller 205 is configured to control to apply an electric field to the first HPDLC layer 203 and the second HPDLC layer 204.

Optionally, the emergent light of the relay optical system 102 may be parallel to the axial direction of the relay optical system 102.

Figure 5:
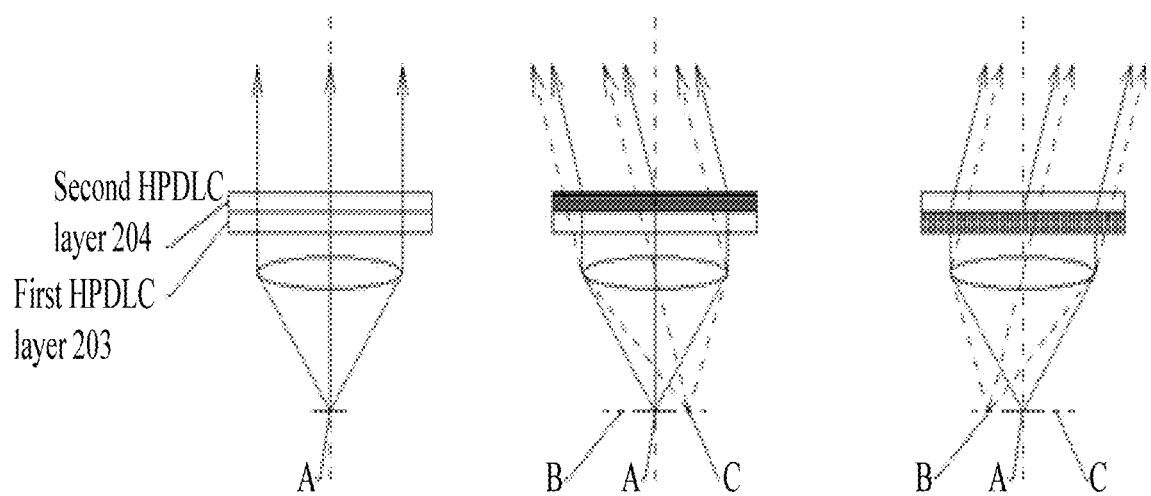
FIG. 5 is a schematic diagram of another HPDLC layer according to an embodiment of the present disclosure.

In the embodiment of the present disclosure, two layers of HPDLCs are arranged behind the relay optical system 102 in a laminated manner, and are respectively marked as the first HPDLC layer 203 and the second HPDLC layer 204, as shown in FIG. 5.

It should be noted that, the controller 205 is not shown in FIG. 5. The controller 205 may be mounted at any position of the HPDLC optical apparatus 20 as long as the first HPDLC layer 203 and the second HPDLC layer 204 can be controlled.

When the controller 205 applies an electric field to the first HPDLC layer 203 and the second HPDLC layer 204, the light given out by the image source 101 is as shown by solid lines in the left figure.

When the controller 205 applies an electric field to the first HPDLC layer 203 and does not apply an electric field to the second HPDLC layer 204, the first HPDLC 203 deflects light rays projected by the relay optical system 102 to a first view field. As shown in the middle figure, the solid lines are emergent light rays, passing through the relay optical system 102, of the image source 101 and the emergent directions are designed to be the same as an image source C shown by dotted lines in the figure;

Correspondingly, when the controller 205 applies an electric field to the second HPDLC layer 204 and does not apply an electric field to the first HPDLC layer 203, the second HPDLC 204 deflects light rays projected by the relay optical system 102 to a second view field. As shown in the right figure, the solid lines are emergent light rays, passing through the relay optical system 102, of the image source 101 and the emergent directions are designed to be the same as an image source B shown by dotted lines in the figure.

It should be understood that, the dotted lines in FIG. 5 do not exist in an actual system. The dotted lines in FIG. 5 merely are for clear, concise and exemplary description.

The first HPDLC layer 203 and the second HPDLC layer 204 enable an angular spectrum of the emergent light rays to deflect under the control of the controller 205. The angular spectrum may be consistent with an angular spectrum generated by the virtual image source B or C.

According to the HPDLC optical apparatus 20 disclosed by the embodiment of the present disclosure, a small-size image source may be used, and volumes of other components matched with the image source such as a drive circuit all may be reduced correspondingly; meanwhile, since view field angles of incident light rays of the relay optical system are reduced, the difficulty and the complexity in designing the relay optical system are reduced; and moreover, the number of the lenses included in the relay optical system may be reduced, and thus the volume of the relay optical system may be reduced.

Figure 6:
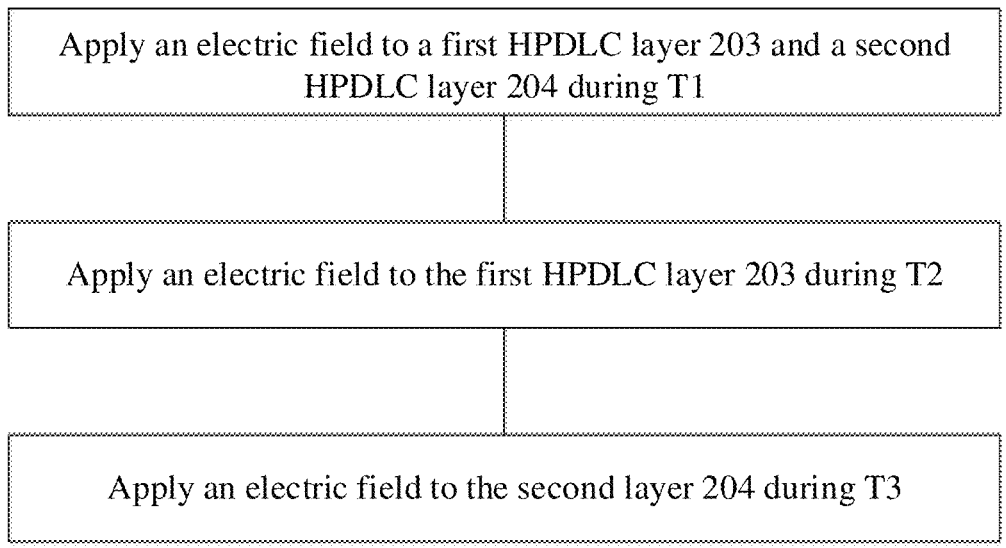
FIG. 6 is a schematic diagram of a controller according to an embodiment of the present disclosure.

Optionally, as shown in FIG. 6, the controller 205 may be further configured to apply an electric field to the first HPDLC layer 203 and the second HPDLC layer 204 during a first time period T1, apply an electric field to the first HPDLC layer 203 during a second time period T2, and apply an electric field to the second HPDLC layer 204 during a third time period T3.

Further optionally, T1, T2 and T3 may be the same and all are ⅓f, and f is an image refresh rate. For example, if the image refresh rate f is 60 Hz, T1=T2=T3=1/180 s. In this case, a display screen adopted by the image source should at least have a refresh rate of 180 Hz.

The person skilled in the art further may flexibly determine the number of time periods and the duration of each time period according to an actual demand. For example, the controller 205 may be further configured to apply an electric field to the first HPDLC layer 203 during the first time period T1 and apply an electric field to the second HPDLC layer 204 during the second time period T2.

Figure 18:
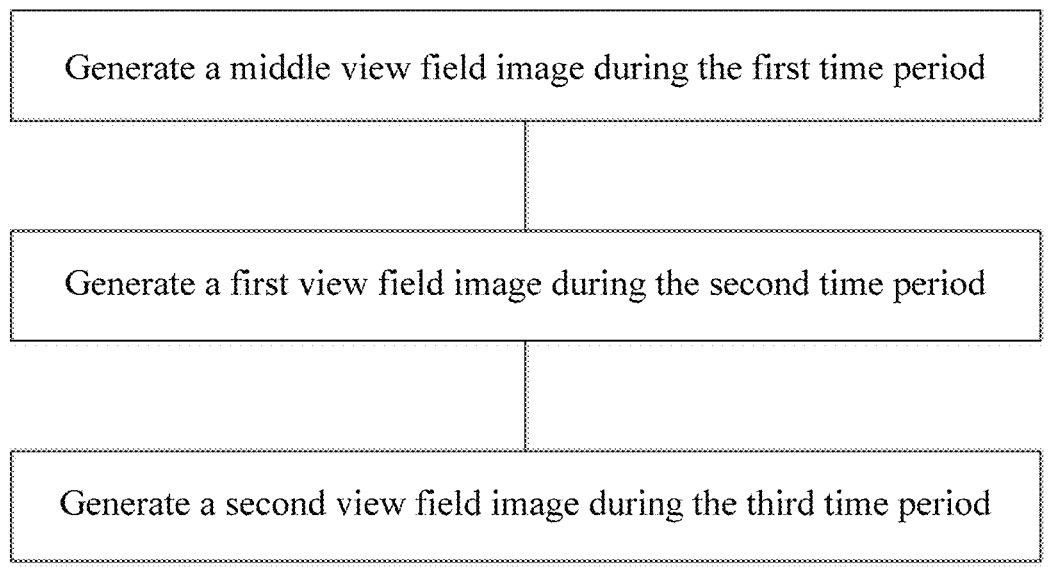
FIG. 18 is a schematic diagram showing operation of an image source according to an embodiment of the present disclosure.

Optionally, as shown in FIG. 18, the image source 101 may be further configured to generate a middle view field image during T1, generate a first view field image during T2 and generate a second view field image during T3. The middle view field image, the first view field image and the second view field image are jointly formed into an integral view field, for expanding a view field angle.

The person skilled in the art should understand that, the image generated by the image source 101 may be determined according to the number of the time periods, the duration of each time period and the view field angle in an actual demand. For example, the image source 101 may be further configured to generate the first view field image during T1 and generate the second view field image during T2.

Figure 19:
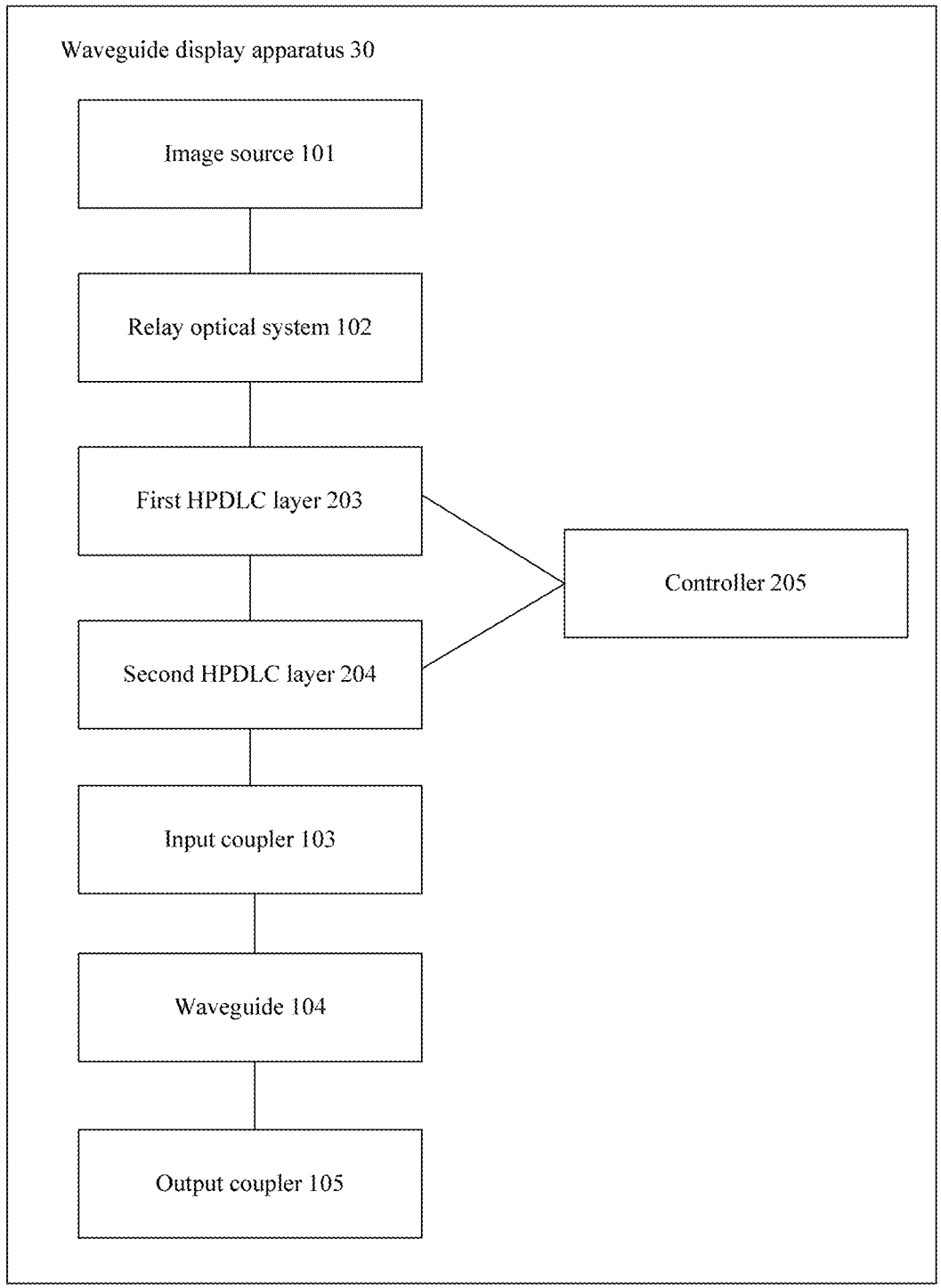
FIG. 19 is a schematic diagram of a waveguide display apparatus according to an embodiment of the present disclosure.

The technical solutions of the HPDLC optical apparatus 20 may be applied to a waveguide display apparatus 10. Specifically, as shown in FIG. 19, an embodiment of the present disclosure discloses a waveguide display apparatus 30, which includes an image source 101, a relay optical system 102, an input coupler 103, a waveguide 104, an output coupler 105, a first HPDLC layer 203 and a second HPDLC layer 204 that are arranged in a laminated manner, and a controller 205, where, the image source 101 is configured to display an image;

the relay optical system 102 is configured to project the image displayed by the image source 101 to the first HPDLC layer 203 and the second HPDLC layer 204, and image at infinity;

the first HPDLC layer 203 and the second HPDLC layer 204 are perpendicular to an axial direction of the relay optical system 102, and directions of diffracted light from the first HPDLC layer 203 and diffracted light from the second HPDLC layer 204 are different from each other;

the controller 205 is configured to control to apply an electric field to the first HPDLC layer 203 and the second HPDLC layer 204;

the input coupler 103 is configured to couple emergent light of the first HPDLC layer 203 and the second HPDLC layer 204 into the waveguide 104; and the output coupler 105 is configured to couple out light propagated in the waveguide 104.

It should be noted that, the person skilled in the art further may equivalently replace at least one component in the waveguide display apparatus 30, or apply the HPDLC optical apparatus 20 to other display apparatuses, in a specific implementation process as required according to the technical solutions disclosed in the embodiment of the present disclosure, and this is not limited in the present disclosure.

Optionally, the emergent light of the relay optical system 102 may be parallel to the axial direction of the relay optical system 102.

Optionally, the input coupler 103 further may include a first waveguide coupling-in grating and a second waveguide coupling-in grating that are arranged in a laminated manner. Further optionally, the diffraction efficiency of the first waveguide coupling-in grating within a first angle range is greater than or equal to the preset diffraction efficiency, and the diffraction efficiency of the second waveguide coupling-in grating within a second angle range is greater than or equal to the preset diffraction efficiency. A sum of the first angle range and the second angle range is greater than or equal to a preset view field angle.

Figure 7:
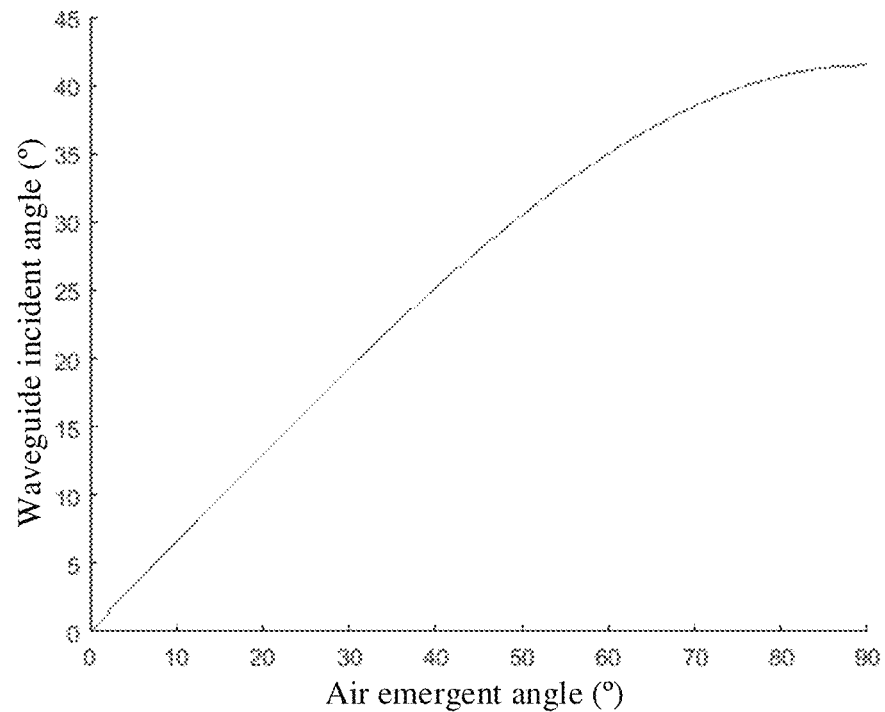
FIG. 7 is a schematic diagram of a relationship between refraction angles of light in a waveguide and an air interface according to an embodiment of the present disclosure.

The total view field angle in the waveguide should be smaller than that in the air. For example, when the average refractive index of the waveguide is 1.51 and the refractive index of the air is 1, a relationship between refraction angles of the light in the waveguide and in an air interface is as shown in FIG. 7. To achieve the view field angle of 30° in the air, the total view field angle in the waveguide is about 19.4° and the input coupler needs to have relatively high diffraction efficiency within the view field angle of 19.4°. For example, the diffraction efficiency threshold is 50%.

Figure 8:
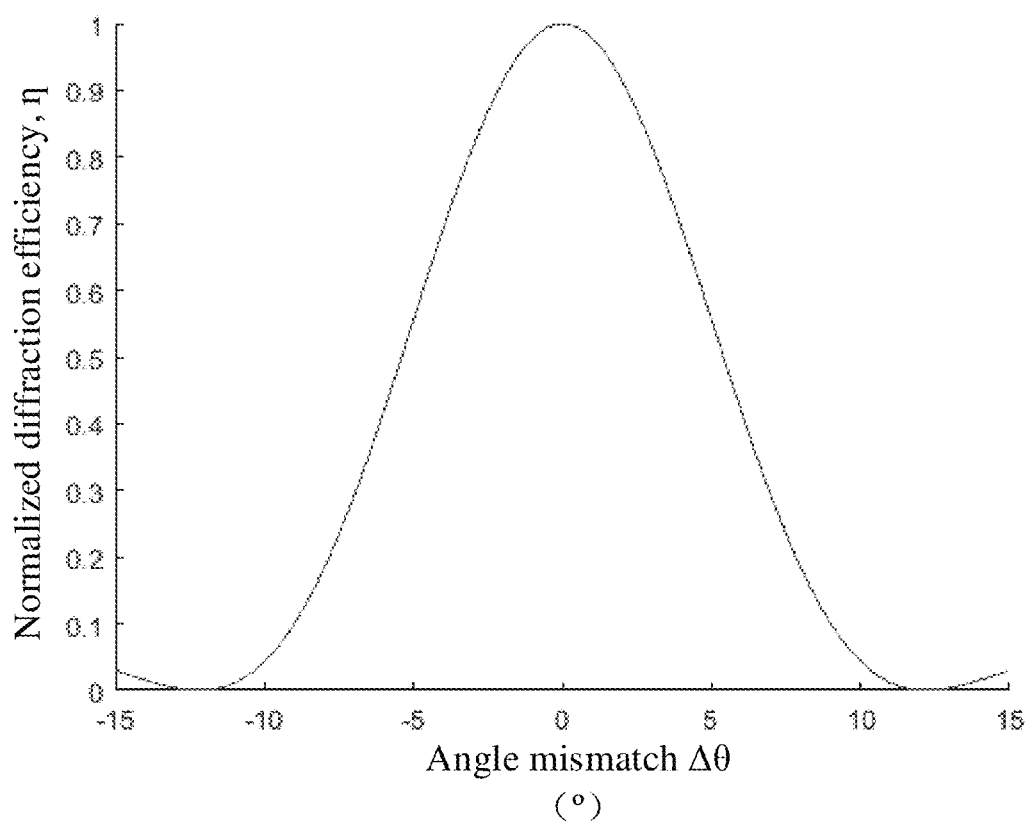
FIG. 8 is a schematic diagram of diffraction efficiency of a single-layer grating according to an embodiment of the present disclosure.
Figure 9:
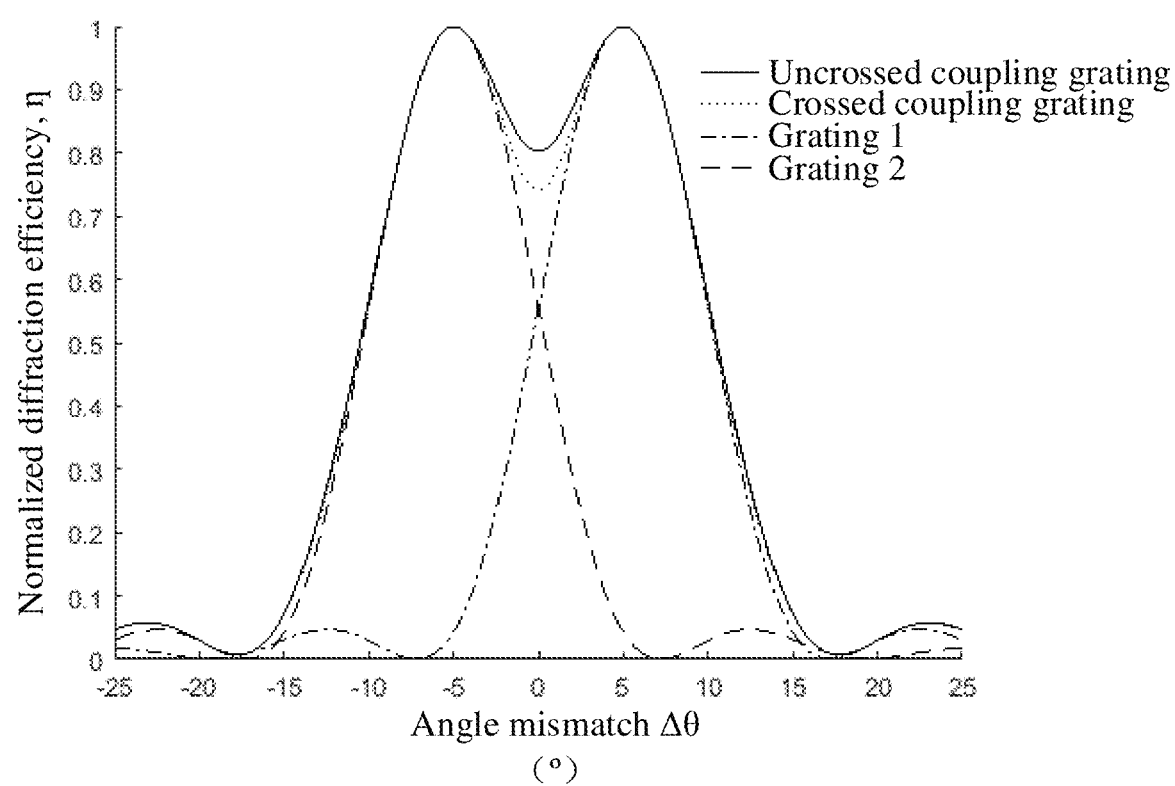
FIG. 9 is a schematic diagram of diffraction efficiency of a combined grating according to an embodiment of the present disclosure.

If the diffraction efficiency of a single-layer grating is as shown in FIG. 8, to meet the requirement on a view field angle threshold of 20° in the waveguide, it may be appropriate to use a two-layer combined grating, that is, a combined grating laminated by the first waveguide coupling-in grating and the second waveguide coupling-in grating, and the diffraction efficiency is as shown in FIG. 9. The two-layer combined grating has the diffraction efficiency higher than 50% within ±10° range. In other words, it meets the requirements on the view field angle threshold of 20°.

Figure 10:
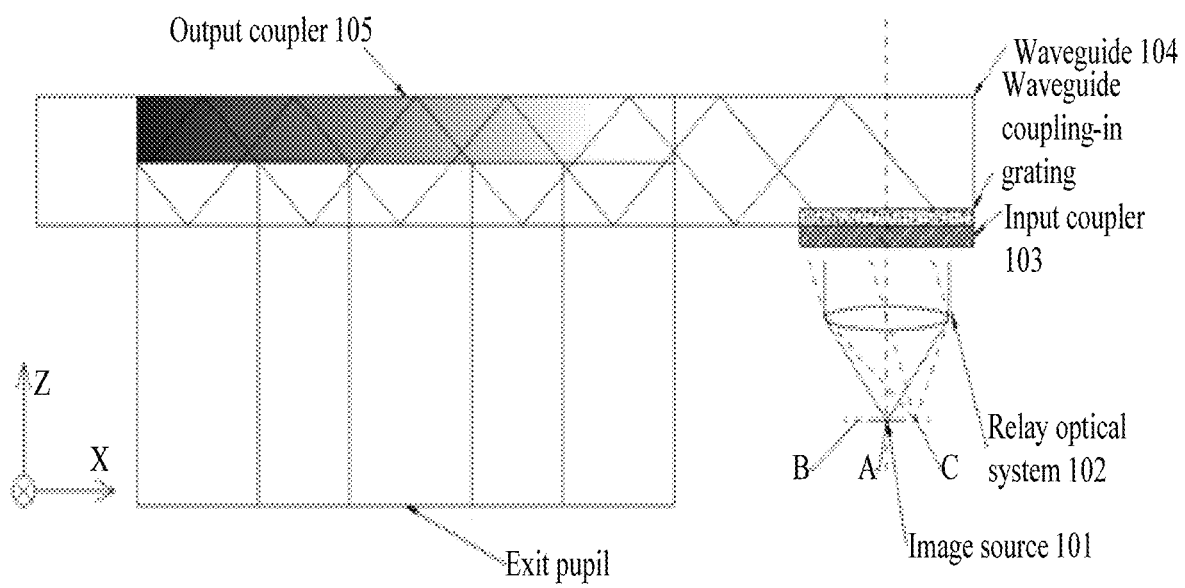
FIG. 10 is a schematic diagram of another waveguide display apparatus according to an embodiment of the present disclosure.

Optionally, the output coupler 105 may include a coupling-out grating. As shown in FIG. 10, the coupling-out grating has the lowest diffraction efficiency on one side close to the input coupler 103, and the coupling-out grating has the highest diffraction efficiency on one side far away from the input coupler 103. Specifically, in FIG. 10, different diffraction efficiencies are indicated by different gray levels.

In light of exit pupil extension of the output coupler 105 in an X direction, an exit pupil may be extended very conveniently by virtue of the coupling-out grating. When the exit pupil extension is performed in the X direction using the coupling-out grating, the output grating has the strongest light intensity on one side close to the input coupler 103. Along with the coupling output, the light intensities at positions far away from the input coupler 103 are weakened gradually. Therefore, with the higher diffraction efficiency, the uniformity of output light intensities in a whole pupil range can be guaranteed.

Figure 11:
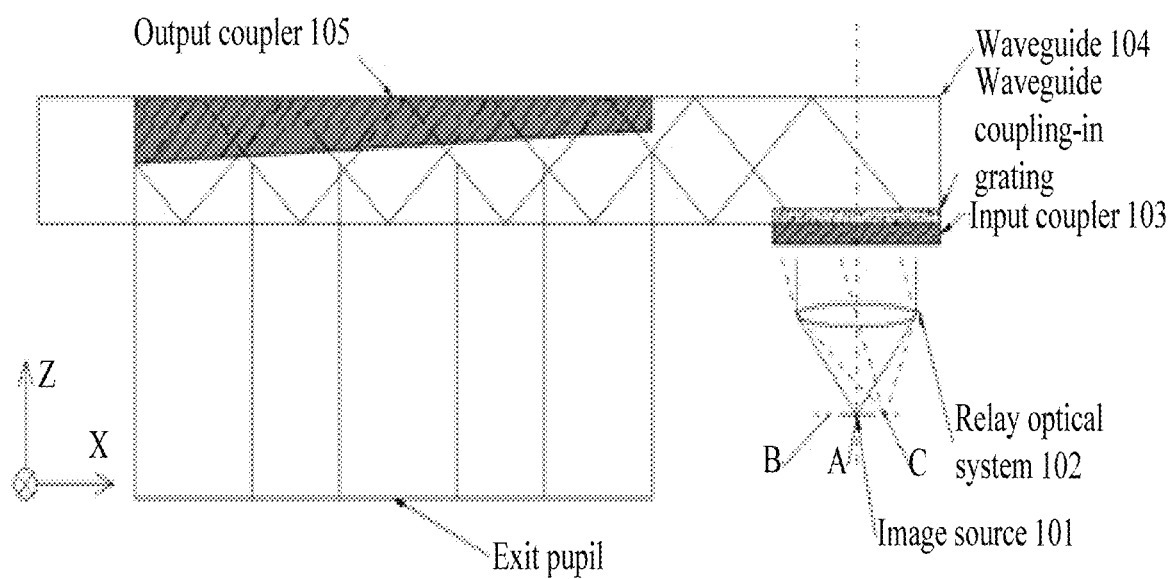
FIG. 11 is a schematic diagram of another waveguide display apparatus according to an embodiment of the present disclosure.

Further optionally, the coupling-out grating has a smallest thickness on one side close to the input coupler 103, and the coupling-out grating has a largest thickness on one side far away from the input coupler 103, as shown in FIG. 11. The larger thickness of the coupling-out grating indicates the higher diffraction efficiency. The thickness of the whole coupling-out grating may be optimized correspondingly according to an objective and a demand in the specific implementation process, and also may be designed according to a demand of light intensity distribution at a certain or some positions in terms of a design value.

Optionally, the waveguide display apparatus 30 further may include: a spatial light modulator 106 arranged at an exit pupil position of the waveguide 104 and configured to focus emergent light of the waveguide 104 to a preset position.

Figure 12:
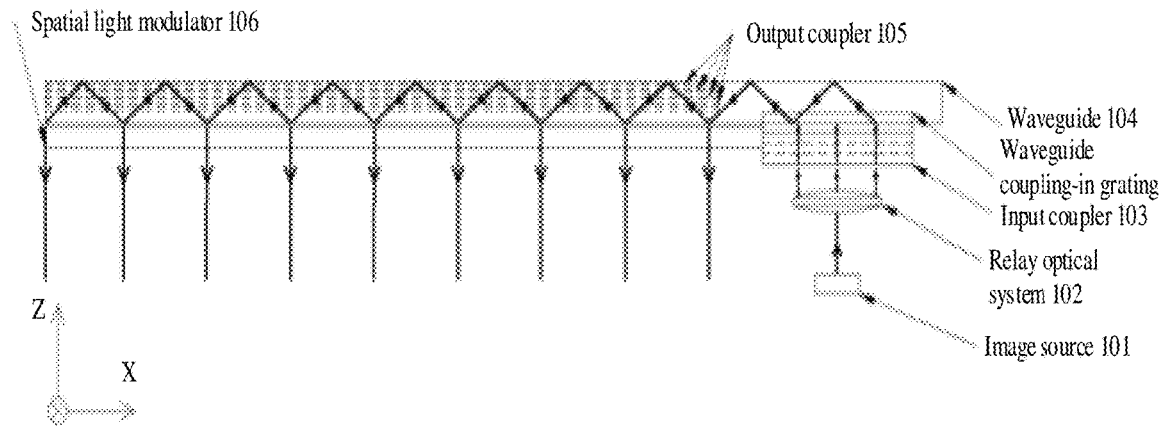
FIG. 12 is a schematic diagram of another waveguide display apparatus according to an embodiment of the present disclosure.

Through program adjustment, the spatial light modulator 106 may implement different degrees of diopter adjustment, so as to adapt to eyesight conditions of different users. For a user with normal eyesight, the spatial light modulator 106 may be controlled to focus the emergent light to infinity, as shown in FIG. 12.

Figure 13:
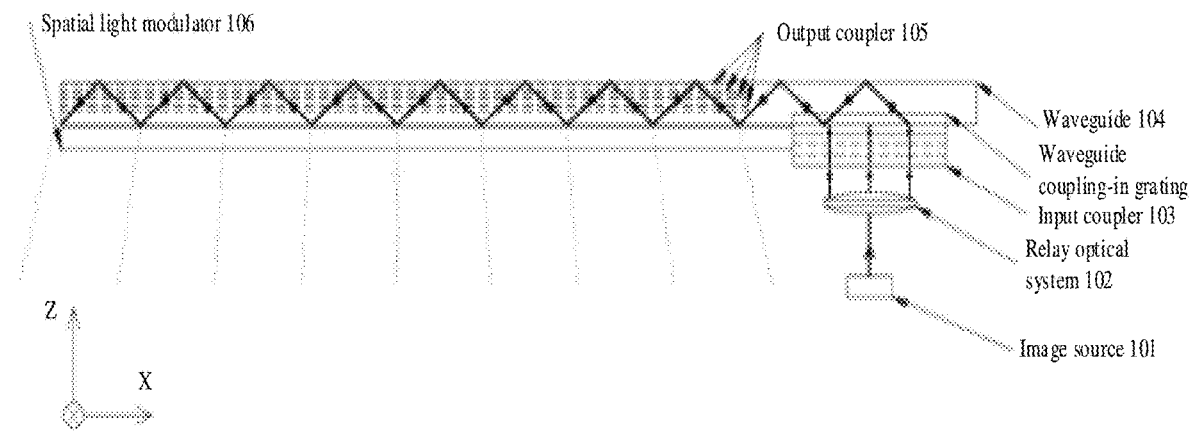
FIG. 13 is a schematic diagram of another waveguide display apparatus according to an embodiment of the present disclosure.

For a user with myopia, the spatial light modulator 106 may be controlled to diverge the emergent light rays and determine an appropriate diopter. As shown in FIG. 13, the user with myopia can clearly observe a displayed image content. Meanwhile, after passing through the spatial light modulator 106, the surrounding environmental light rays are also diverged by the spatial light modulator 106, so that the user with myopia can clearly observe a surrounding environment without wearing a piece of glasses for myopia.

Figure 14:
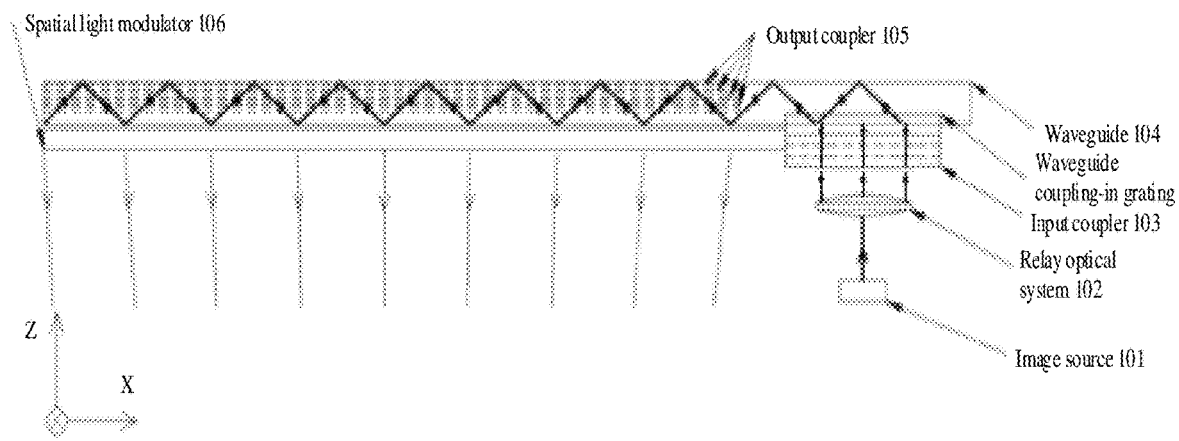
FIG. 14 is a schematic diagram of another waveguide display apparatus according to an embodiment of the present disclosure.

For a user with hyperopia, the spatial light modulator 106 may be controlled to gather the emergent light rays and determine an appropriate diopter. As shown in FIG. 14, the user with hyperopia can clearly observe a displayed image content. Meanwhile, after passing through the spatial light modulator 106, the surrounding environmental light rays are also gathered by the spatial light modulator 106, so that the user with hyperopia can clearly observe a surrounding environment without wearing a piece of glasses for hyperopia.

Figure 15:
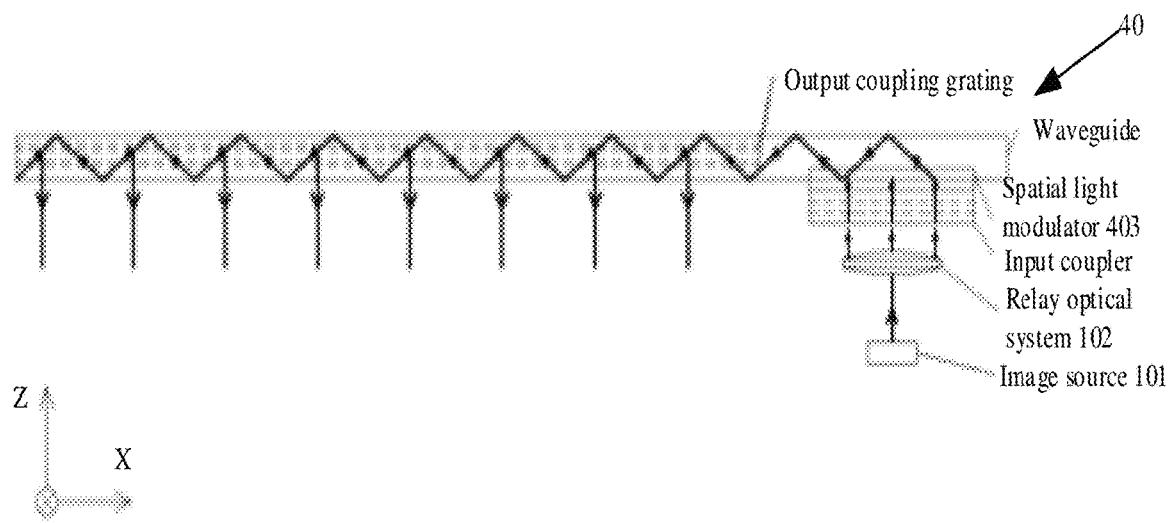
FIG. 15 is a schematic diagram of a spatial light modulator optical apparatus according to an embodiment of the present disclosure.
Figure 20:
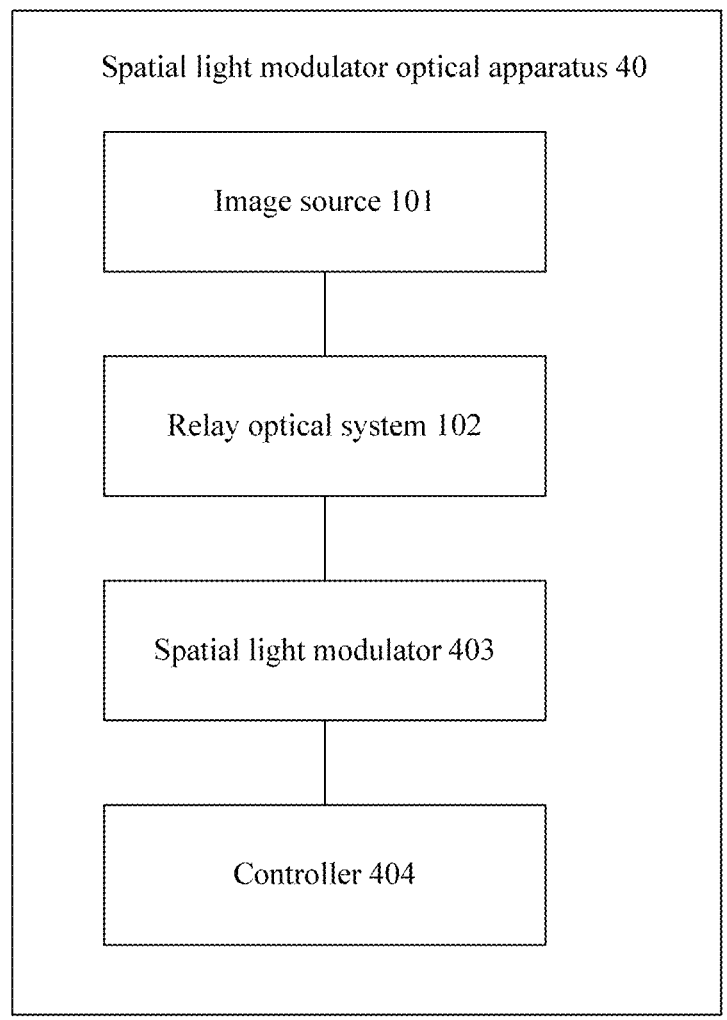
FIG. 20 is a schematic diagram of a spatial light modulator optical apparatus according to an embodiment of the present disclosure.

An embodiment of the present disclosure further discloses a spatial light modulator optical apparatus 40. As shown in FIG. 15 and FIG. 20, it includes an image source 101, a relay optical system 102, a spatial light modulator 403 and a controller 404, where, the image source 101 is configured to display an image;

the relay optical system 102 is configured to project the image displayed by the image source 101 to the spatial light modulator 403, and image at infinity; and the controller 404 is configured to control the spatial light modulator 403 to modulate emergent light of the spatial light modulator 403.

It should be noted that, the controller 404 is not shown in FIG. 15. The controller 404 may be mounted at any position of the spatial light modulator optical apparatus 40 as long as the spatial light modulator 403 can be controlled.

The spatial light modulator 403 may modulate space distribution of light waves. Generally, the spatial light modulator 403 may modulate a phase position, an amplitude, a strength, a frequency or a polarization state of each light wave. The spatial light modulator 403 may include two-dimensional arrays arranged densely, and each of array units may be independently controlled by an electrical signal to change its own optical characteristics and modulate light waves irradiated thereon. The spatial light modulator 403 may take a liquid crystal layer as a light modulation material. When different electric fields are applied to each area on the liquid crystal layer, arrangement directions and positions of liquid crystal molecules may be changed and thus the refractive index of the each array unit is changed and the phase change of the incident light is modulated. When different phases are super-positioned on light at different positions, a propagation direction of the light may be deflected.

In the specific implementation process, the person skilled in the art may consider that the spatial light modulator 403 may be configured to replace the first HPDLC layer 203 and the second HPDLC layer 204 in the HPDLC optical apparatus 20 or the waveguide display apparatus 30, and may be configured to control the propagation direction of the emergent light.

For description of the image source 101 and the relay optical system 102, refer to that in the foregoing embodiments, and details are not repeated herein.

Optionally, the emergent light of the relay optical system 102 may be parallel to an axial direction of the relay optical system 102.

Optionally, the controller 404 may be further configured to control the emergent light of the spatial light modulator 403 to project to a middle view field direction during a first time period T1;

control the emergent light of the spatial light modulator 403 to project to a first view field direction during a second time period T2; and control the emergent light of the spatial light modulator 403 to project to a second view field direction during a third time period T3.

Optionally, the image source 101 may be further configured to generate a middle view field image during T1, generate a first view field image during T2 and generate a second view field image during T3, where the middle view field image, the first view field image and the second view field image are jointly formed into an integral view field, to expand a view field angle.

For description of T1, T2 and T3, refer to that in the foregoing embodiments and details are not repeated herein.

Figure 21:
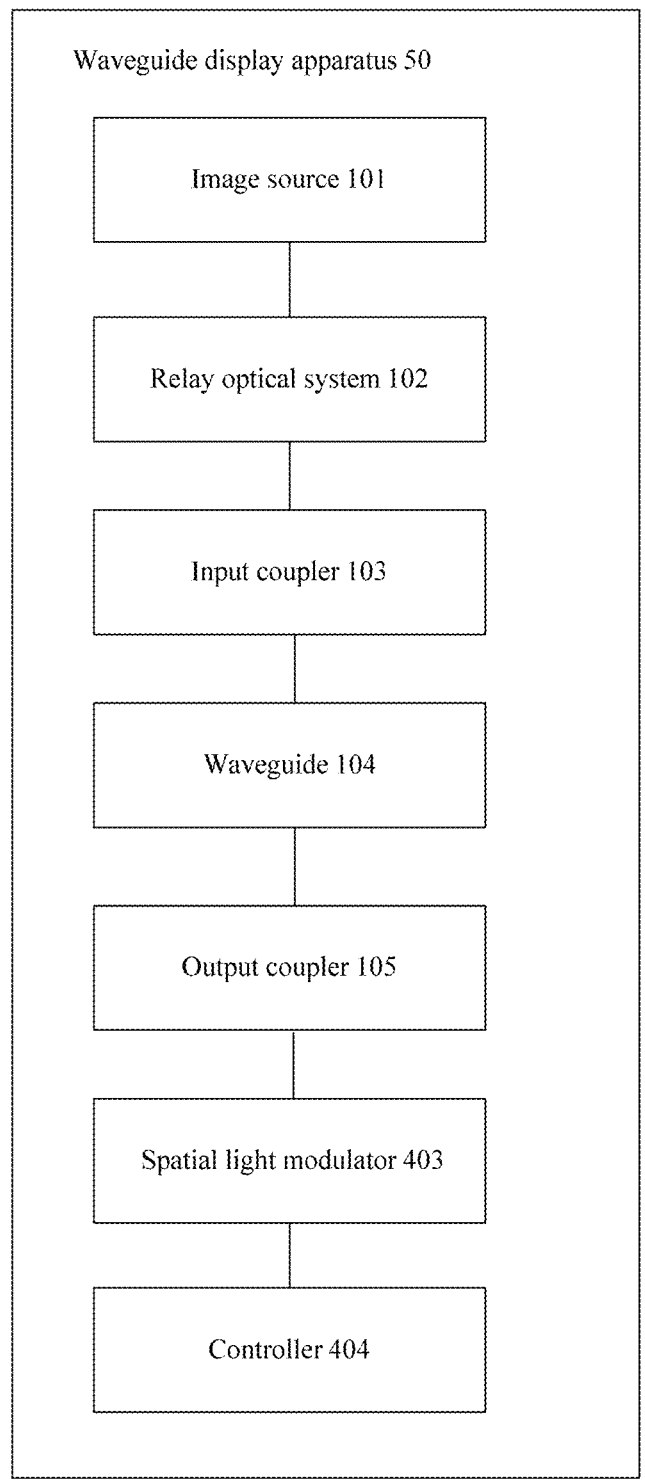
FIG. 21 is a schematic diagram of a waveguide display apparatus according to another embodiment of the present disclosure.

The technical solutions of the spatial light modulator optical apparatus 40 may be applied to a waveguide display apparatus 10. Specifically, as shown in FIG. 21, an embodiment of the present disclosure discloses a waveguide display apparatus 50, which includes an image source 101, a relay optical system 102, an input coupler 103, a waveguide 104, an output coupler 105, a spatial light modulator 403 and a controller 404, where, the image source 101 is configured to display an image;

the relay optical system 102 is configured to project the image displayed by the image source 101 to the spatial light modulator 403, and image at infinity;

the controller 404 is configured to control the spatial light modulator 403 to modulate emergent light of the spatial light modulator 403;

the input coupler 103 is configured to couple the emergent light of the spatial light modulator 403 into the waveguide 104; and the output coupler 105 is configured to couple out light propagated in the waveguide 104.

The description of each component of the waveguide display apparatus 50 has been stated above and is not repeated herein; the person skilled in the art may choose corresponding technical solutions in the specific implementation process in combination with the contents disclosed in the present disclosure.

Optionally, the input coupler 103 further may include a first waveguide coupling-in grating and a second waveguide coupling-in grating that are arranged in a laminated manner. Further optionally, the diffraction efficiency of the first waveguide coupling-in grating within a first angle range is greater than or equal to a diffraction efficiency threshold, and the diffraction efficiency of the second waveguide coupling-in grating within a second angle range is greater than or equal to the diffraction efficiency threshold, where a sum of the first angle range and the second angle range is greater than or equal to a view field angle threshold.

Optionally, the output coupler 105 may include a waveguide coupling-out grating. Further optionally, the coupling-out grating has the lowest diffraction efficiency on one side close to the input coupler 103, and the coupling-out grating has the highest diffraction efficiency on one side far away from the input coupler 103. For example, the coupling-out grating has a smallest thickness on one side close to the input coupler 103, and the coupling-out grating has a largest thickness on one side far away from the input coupler 103.

Optionally, the waveguide display apparatus 50 further may include: a spatial light modulator 106 arranged at an exit pupil position of the waveguide 104 and configured to focus emergent light of the waveguide 104 to a preset position.

Figure 16:
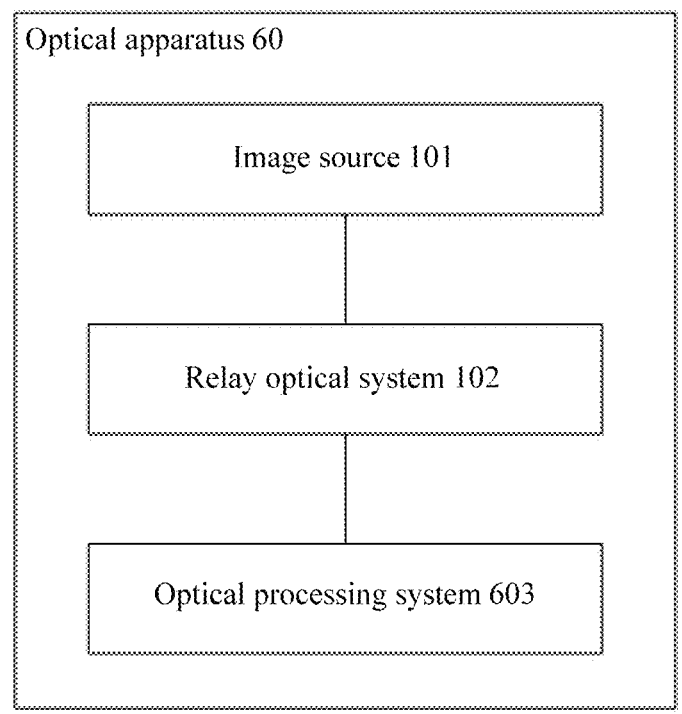
FIG. 16 is a schematic diagram of an optical apparatus according to an embodiment of the present disclosure.

An embodiment of the present disclosure further discloses an optical apparatus 60. As shown in FIG. 16, it includes an image source 101, a relay optical system 102 and an optical processing system 603, where, the image source 101 is configured to display an image;

the relay optical system 102 is configured to project the image displayed by the image source 101 to the optical processing system 603, and image at infinity; and the optical processing system 603 is configured to sequentially project incident light in a same direction to at least two preset directions.

Optionally, the optical processing system 603 may include a first HPDLC layer 203, a second HPDLC layer 204 and a controller 205. The first HPDLC layer 203, the second HPDLC layer 204 and the controller 205 have been described above and are not repeated herein.

Optionally, when emergent light of the relay optical system 102 is parallel to an axial direction of the relay optical system 102, the optical processing system 603 may be configured to sequentially project incident light parallel to the axial direction of the relay optical system 102 to the at least two preset directions.

Optionally, the optical processing system 603 further may include a spatial light modulator 403 and a controller 404. The spatial light modulator 403 and the controller 404 have been described above and are not repeated herein.

Figure 22:
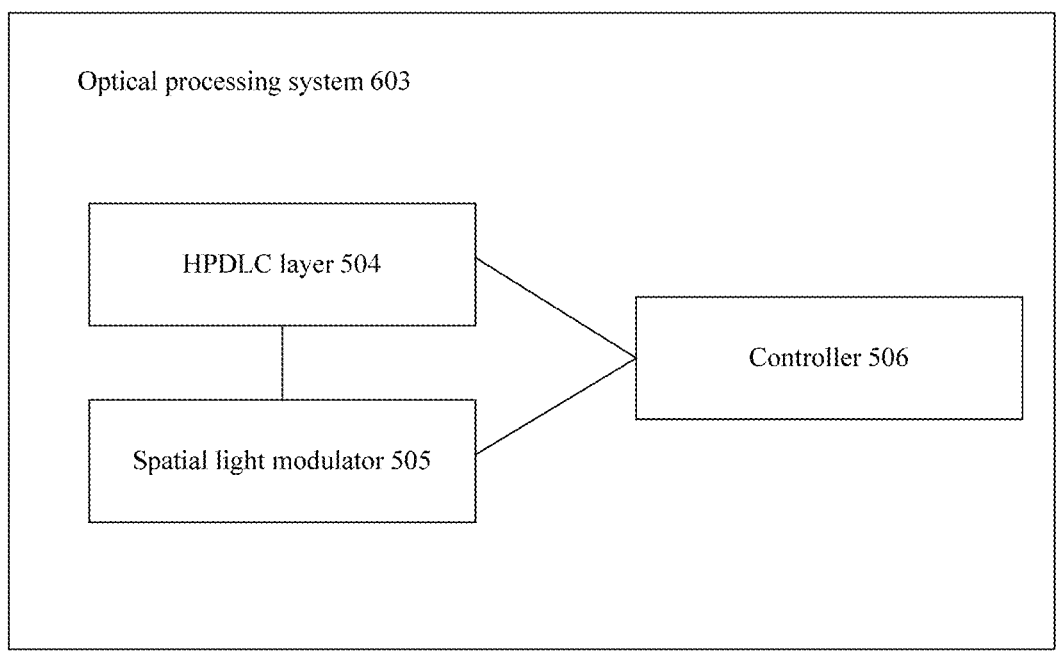
FIG. 22 is a schematic diagram of an optical processing system according to an embodiment of the present disclosure.

The person skilled in the art further may determine a specific implementation manner of the optical processing system using technical solutions combined with the HPDLC layer and the spatial light modulator according to contents disclosed in the present disclosure, and this is not limited in the present disclosure. For example, as shown in FIG. 22, the optical processing system 603 further may include an HPDLC layer 504, a spatial light modulator 505 and a controller 506, where, the controller 506 may be configured to apply a voltage to the HPDLC layer 504 during a first time period T1 and control emergent light of the spatial light modulator 505 to project to a first view field direction, where the emergent light of the optical processing system 603 is projected to the first view field direction at this moment;

and control emergent light of the spatial light modulator 505 to project to a middle view field direction during a second time period T2, where the emergent light of the optical processing system 603 is projected to the second view field direction at this moment.

The above are only for illustrative purpose and the person skilled in the art further may combine more implementation manners without creative efforts.

Figure 23:
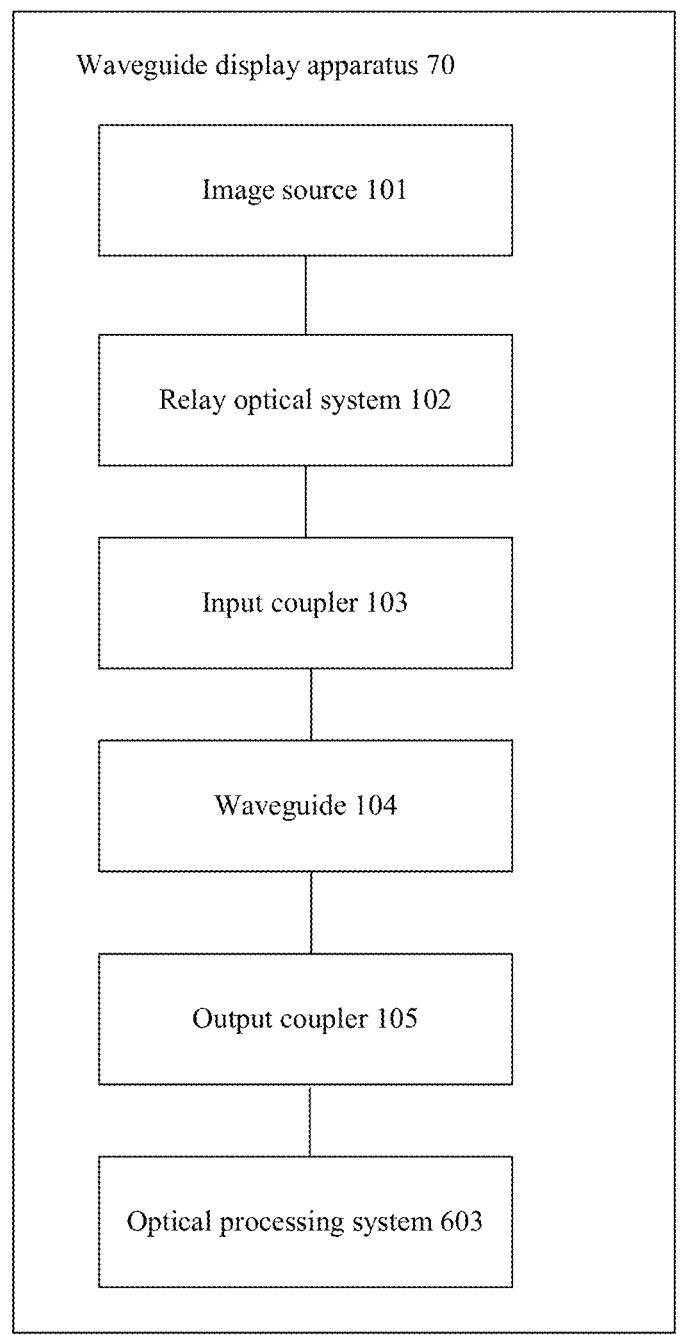
FIG. 23 is a schematic diagram of a waveguide display apparatus according to still another embodiment of the present disclosure.

As shown in FIG. 23, an embodiment of the present disclosure further discloses a waveguide display apparatus 70, which includes an image source 101, a relay optical system 102, an input coupler 103, a waveguide 104, an output coupler 105 and an optical processing system 603, where, the image source 101 is configured to display an image;

the relay optical system 102 is configured to project the image displayed by the image source 101 to the optical processing system 603, and image at infinity;

the optical processing system 603 is configured to sequentially project incident light in a same direction to at least two preset directions;

the input coupler 103 is configured to couple emergent light of the optical processing system 603 into the waveguide 104; and the output coupler 105 is configured to couple out light propagated in the waveguide 104.

The image source 101, the relay optical system 102, the input coupler 103, the waveguide 104, the output coupler 105 and the optical processing system 603 have been described above and are not repeated herein.

Optionally, when emergent light of the relay optical system 102 is parallel to an axial direction of the relay optical system 102, the optical processing system 603 may be configured to sequentially project incident light parallel to the axial direction of the relay optical system 102 to the at least two preset directions.

Optionally, the input coupler 103 further may include a first waveguide coupling-in grating and a second waveguide coupling-in grating that are arranged in a laminated manner. Further optionally, the diffraction efficiency of the first waveguide coupling-in grating within a first angle range is greater than or equal to a diffraction efficiency threshold, and the diffraction efficiency of the second waveguide coupling-in grating within a second angle range is greater than or equal to the diffraction efficiency threshold, where a sum of the first angle range and the second angle range is greater than or equal to a view field angle threshold.

Optionally, the output coupler 105 may include a waveguide coupling-out grating. Further optionally, the coupling-out grating has the lowest diffraction efficiency on one side close to the input coupler 103, and the coupling-out grating has the highest diffraction efficiency on one side far away from the input coupler 103. For example, the coupling-out grating has a smallest thickness on one side close to the input coupler 103, and the coupling-out grating has a largest thickness on one side far away from the input coupler 103.

Optionally, the waveguide display apparatus 70 further may include: a spatial light modulator 106 arranged at an exit pupil position of the waveguide 104 and configured to focus emergent light of the waveguide 104 to a preset position.

According to the optical apparatus and the waveguide display apparatus based on the optical apparatus disclosed by the embodiments, a small-size image source may be used, and volumes of other components matched with the image source such as a drive circuit all may be reduced correspondingly; meanwhile, since view field angles of incident light rays of the relay optical system are reduced, the difficulty and the complexity in designing the relay optical system are reduced; and moreover, the number of the lenses included in the relay optical system may be reduced, and thus the volume of the relay optical system may be reduced.

It should be understood that, the present disclosure is not limited to the flowchart and structures described above and shown in the accompanying drawings, and various modifications and changes may be made without departing from the scope. The scope of the present disclosure is limited only by the appended claims.

What is claimed is:

1. An optical apparatus comprising:
   an image source;
   a relay optical system; and
   an optical processing system;
   wherein:
   the image source is configured to display an image;
   the relay optical system is configured to project the image displayed by the image source to the optical processing system, and to image at infinity; and
   the optical processing system is configured to project incident light from the relay optical system in a same direction to at least two different preset emergent directions in different time periods;
   the optical processing system includes:
   a first Holographic Polymer Dispersed Liquid Crystal (HPDLC) layer and a second HPDLC layer that are arranged in a laminated manner and are perpendicular to an axial direction of the relay optical system, a direction of diffracted light from the first HPDLC layer being different from a direction of diffracted light from the second HPDLC layer; and
   a controller configured to control an electric field applied to at least one of the first HPDLC layer or the second HPDLC layer;
   the relay optical system is configured to project the image displayed by the image source to the first HPDLC layer and the second HPDLC layer, and to image at infinity;
   wherein the controller is further configured to:
   control the electric field to be applied to the first HPDLC layer and the second HPDLC layer during a first time period;
   control the electric field to be applied to the first HPDLC layer during a second time period; and
   control the electric field to be applied to the second HPDLC layer during a third time period.

2. The optical apparatus according to claim 1, wherein the image source is further configured to:
   generate a middle view field image during the first time period;
   generate a first view field image during the second time period; and
   generate a second view field image during the third time period.

3. The optical apparatus according to claim 1, wherein the first time period, the second time period, and the third time period all are equal to a reciprocal of a refresh rate of the image source.

4. The optical apparatus according to claim 1, wherein:
   the optical processing system includes:
   a spatial light modulator; and
   a controller configured to control the spatial light modulator to modulate emergent light of the spatial light modulator; and
   the relay optical system is configured to project the image displayed by the image source to the spatial light modulator, and image at infinity.

5. The optical apparatus according to claim 4, wherein the controller is further configured to:
   control the emergent light of the spatial light modulator to project to a middle view field direction during a first time period;
   control the emergent light of the spatial light modulator to project to a first view field direction during a second time period; and
   control the emergent light of the spatial light modulator to project to a second view field direction during a third time period.

6. The optical apparatus according to claim 5, wherein the image source is further configured to:
   generate a middle view field image during the first time period;
   generate a first view field image during the second time period; and
   generate a second view field image during the third time period.

7. The optical apparatus according to claim 5, wherein the first time period, the second time period and the third time period all are equal to a reciprocal of a refresh rate of the image source.

* * * * *